(12) United States Patent
Kohli et al.

(10) Patent No.: US 11,354,646 B2
(45) Date of Patent: Jun. 7, 2022

(54) METHODS AND SYSTEMS FOR SUPPORTING QR CODE TRANSACTIONS

(71) Applicant: Mastercard International Incorporated, Purchase, NY (US)

(72) Inventors: Manoneet Kohli, O'Fallon (MO); Shane Lansley Jorge Jose Deniz, Ardsley, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/598,062

(22) Filed: Oct. 10, 2019

(65) Prior Publication Data
US 2021/0110375 A1    Apr. 15, 2021

(51) Int. Cl.
*G06Q 20/32* (2012.01)
*G06K 19/06* (2006.01)

(52) U.S. Cl.
CPC ... *G06Q 20/3274* (2013.01); *G06K 19/06037* (2013.01)

(58) Field of Classification Search
CPC .............. G06Q 20/3274; G06K 19/06037
See application file for complete search history.

(56) References Cited

U.S. PATENT DOCUMENTS

| | | | |
|---|---|---|---|
| 6,637,648 B1* | 10/2003 | Gilgen | G06Q 20/4016 235/380 |
| 2016/0034889 A1* | 2/2016 | Downs | G06Q 20/382 705/26.41 |
| 2016/0104155 A1* | 4/2016 | McGaugh | G06Q 20/32 705/65 |
| 2018/0276658 A1* | 9/2018 | Liscia | G06Q 20/102 |
| 2019/0066089 A1 | 2/2019 | Miryala et al. | |
| 2020/0175496 A1* | 6/2020 | Finke | G06Q 20/209 |
| 2020/0279242 A1* | 9/2020 | Dahn | G06Q 20/20 |

* cited by examiner

*Primary Examiner* — Mike Anderson
*Assistant Examiner* — Matthew Cobb
(74) *Attorney, Agent, or Firm* — Buckley, Maschoff & Talwalkar LLC

(57) ABSTRACT

Systems and methods for QR code purchase transaction processing. In an embodiment, an interoperability computer system receives a push-type QR code payment request, validates the push-type QR code payment request, obtains local regulations governing QR code purchase transactions and at least one of a routing configuration for an originating institution (OI) and a routing configuration for a receiving institution (RI). The process also includes determining, by the interoperability computer system, that one of the OI or the RI is not configured for push-type purchase transactions or that local regulations do not permit push-type transactions, generating a pull-type QR code purchase transaction request, and transmitting the pull-type QR code purchase transaction request to a payment network.

12 Claims, 6 Drawing Sheets

METHODS AND SYSTEMS FOR SUPPORTING QR CODE TRANSACTIONS

FIELD OF THE INVENTION

Embodiments generally relate to methods, apparatus and systems for supporting both push-type transactions and pull-type purchase transactions. More specifically, in some embodiments a method and system are disclosed which is capable of supporting the use of Quick Response ("QR") code payment technology across different markets, regardless of whether a cardless transaction is structured as a push-type purchase transaction or as a pull-type purchase transaction.

BACKGROUND

Portable consumer electronic devices, such as smartphones, tablet computers, digital music players and the like, have been developed that include desirable functionality and thus the number of mobile devices and mobile device users and/or owners keeps growing. Such mobile devices can perform many different types of functions, and are also capable of storing different types of information. The popularity of such mobile devices, especially smartphones, has led to the development of processes or applications for using them to conduct financial transactions. For example, payment applications exist which permit the transmission of a payment between a payer (a consumer or payment card account holder or cardholder) and a recipient (or payee, such as a merchant or another cardholder).

Processes are known wherein a payer utilizes a digital camera component of his or her mobile device to scan a code, such as a quick-response ("QR") code (which is a two-dimensional (2D) barcode), for example, at a merchant store to conduct a purchase transaction. A quick-response or QR code is a machine-readable code which consists of an array of black and white squares that convey information. QR codes may store uniform resource locators (URLs) and/or other information that can be read by a camera component of a consumer's mobile device (such as a smartphone). For example, a retailer may have a sticker, label or sheet of paper posted in a retail store that includes a merchant QR code printed thereon, which can be affixed to a countertop or wall near a cash register (or on the cash register itself) at the merchant's retail store. In some cases, the label or sticker containing the merchant QR code printed thereon may be provided to the merchant by a payment processing company (or by a trusted third party), and can include merchant identification data and a merchant payment account number (associated with a financial account of the merchant). In an example purchase transaction, the consumer utilizes the camera component of his or her mobile device and a mobile payment application to scan the merchant's QR code, inputs a purchase transaction amount (the cost or price of the goods or services), and then transmits a payment request to his or her issuer bank to transfer funds (money) from the consumer's payment card account to the merchant's payment account (and such a transaction may be processed by a payments system such as the Mastercard MoneySend™ or Mastercard Send™ platforms). The above example is of a "Push" transaction, wherein funds or money are pushed from, for example, the consumer's payment card account directly to a merchant's financial account. For such transaction processing to be successful, both the merchant and the consumer must be registered with a payments platform that accepts QR code transactions. However, since funds are transferred from a sender account during a "Push" transaction, some challenges may be introduced related to downstream processing such as chargeback operations. In addition, conventional "Push" transactions are not as secure as other types of transactions, such as "Pull" transactions (discussed below), and thus some countries or jurisdictions either do not permit push-type QR code transactions or require that the parties use a proprietary system (or proprietary systems) to conduct push-type QR code transactions in their country or jurisdiction.

Another type of QR code payment transaction is known as a "Pull" transaction. Pull-type transactions are typically initiated by the funds recipient (such as a merchant) to obtain or pull funds from a consumer's financial account (for example, to pull money to cover a purchase transaction from the consumer's payment card account). In QR code pull-type transactions, payment messages flow from the merchant (the creditor) to the consumer (the debtor), but funds flow in the opposite direction (from the consumer's financial account to the merchant's financial account). An important feature of pull-type transactions is that the merchant must first obtain an authorization from the consumer to collect money from the consumer's account, which is also an important regulatory requirement governing pull-type transactions in many countries or jurisdictions.

In the current retail environment, consumers want to be able to conveniently make digital payments using their mobile devices, even when traveling to foreign countries or other jurisdictions. In addition, merchants wish to increase their footprint in the marketplace by accepting all types of digital payments from consumers, such as QR code payments.

However, different jurisdictions have different rules and regulations and/or payment systems in place for conducting QR code transactions which are not necessarily compatible with each other. Thus, a need exists for a QR code payment transaction system and process to facilitate both push-type and pull-type QR code transactions, wherein the QR code payment transaction system and process is agnostic to the merchant financial institution (FI) and/or to the issuer FI support requirements, and which system and process satisfies any and all country regulations, rules and/or laws governing such transactions.

BRIEF DESCRIPTION OF THE DRAWINGS

Features and advantages of some embodiments, and the manner in which the same are accomplished, will become more readily apparent with reference to the following detailed description taken in conjunction with the accompanying drawings, which illustrate exemplary embodiments, wherein.

DETAILED DESCRIPTION

Figure 1:
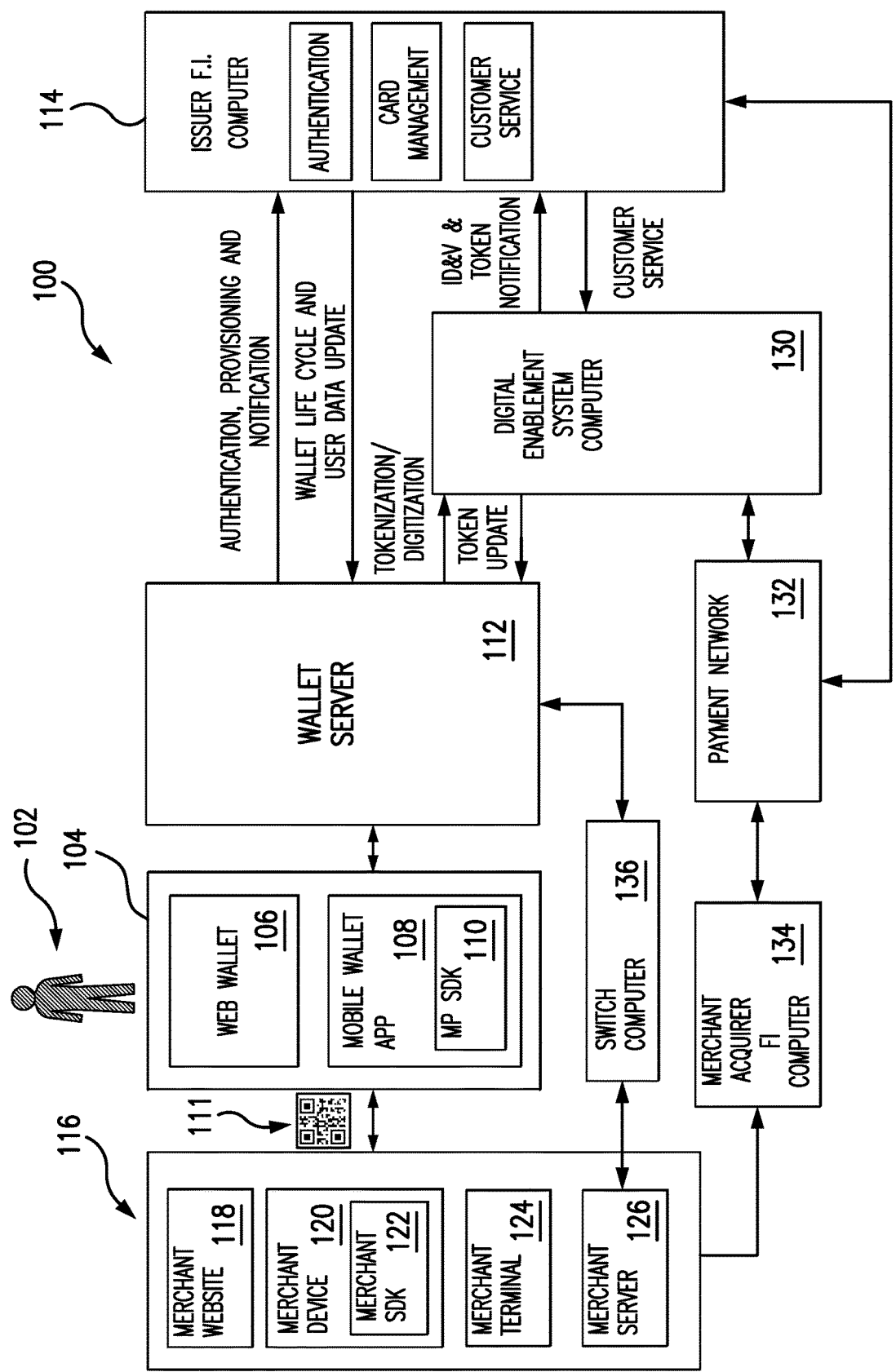
FIG. 1 is a block diagram illustrating a QR code payment system in which teachings of the present disclosure may be applied in accordance with an embodiment of the disclosure.

Reference will now be made in detail to various novel embodiments, examples of which are illustrated in the accompanying drawings. The drawings and descriptions thereof are not intended to limit the invention to any particular embodiment(s). On the contrary, the descriptions provided herein are intended to cover alternatives, modifications, and equivalents thereof. In the following description, numerous specific details are set forth in order to provide a thorough understanding of the various embodiments, but some or all of these embodiments may be practiced without some or all of the specific details. In other instances, well-known process operations have not been described in detail in order not to unnecessarily obscure novel aspects.

A number of terms will be used herein. The use of such terms is not intended to be limiting, but rather are used for convenience and ease of exposition. For example, as used herein, the term "consumer" may be used interchangeably with the term "cardholder" and/or "user" and such terms are used herein to refer to a person, individual, business or other entity that owns (or is authorized to use) a financial account such as a payment card account (for example, a credit card account). In addition, the term "payment card account" may include or be associated with a credit card account, a debit card account, and/or a deposit account or other type of financial account that an account holder may access. The term "payment card account number" or includes a number that identifies a payment card system account or a number carried by a payment card, and/or a number that is used to route a transaction in a payment network that handles debit card and/or credit card transactions and the like. Moreover, as used herein the terms "payment network," "payment card system" and/or "payment system" refer to a system and/or network for processing and/or handling purchase transactions and related financial transactions, which may be operated by a payment card system operator such as Mastercard International Incorporated (the assignee of the present application), or a similar system. In some embodiments, the term "payment card system" may be limited to systems in which member financial institutions (such as banks) issue payment card accounts to individuals, businesses and/or other entities or organizations.

As used herein, the term "issuer" and/or "issuer FI" is used to refer to the financial institution or entity (such as a bank) that issues a payment account (such as a credit card account or debit card account) to a consumer, cardholder or user. The issuer of a payment card maintains the payment card accounts of its cardholders.

In general, and for the purpose of introducing concepts of novel embodiments described herein, disclosed are methods, apparatus and systems for supporting both push-type purchase transactions and pull-type purchase transactions. More specifically, some embodiments include a system and method for facilitating the use of Quick Response ("QR") code payment technology, regardless of whether the transaction is structured as a push payment or as a pull payment. Thus, the disclosed systems and methods advantageously support cardless transactions across many different markets and/or jurisdictions.

FIG. 1 is a block diagram illustrating a QR code payment system 100 in which teachings of the present disclosure may be applied. A user 102 (or cardholder or consumer) habitually carries a mobile device 104, such as a smartphone, tablet computer, or the like, which is configured for entering into mobile device payment transactions. In some embodiments, the mobile device 104 is configured for communications with a wallet server/computer 112 (which may be owned and/or operated by an issuer FI, or an entity such as a Wallet Service Provider (WSP), or a payment processing entity such as Mastercard International Incorporated, the assignee of the present application). Communications between the user's mobile device 104 and the wallet server 112 may occur through use of a private network or a public network and/or combinations thereof, for example, by using the Internet (not shown in FIG. 1).

Referring again to FIG. 1, the wallet server 112 is in turn configured for communications with an issuer financial institution (FI) computer 114 (which may be associated with, for example, a bank which issues payment card accounts to users). In some implementations, the wallet server 112 may transmit mobile device provisioning requests for tokenization and/or digitization, user and/or mobile device authentication requests, wallet and/or card management requests, and/or notification data to the issuer FI computer 114, and may receive responses to such requests and/or data. In addition, the issuer FI computer 114 may provide additional data and or information such as wallet life cycle data, card management data, and/or user data updates to the wallet server 112. The issuer FI computer may also be configured for providing card management services, authentication services and/or access to a customer service representative for customer support regarding the wallet. It should be understood that, in practical QR code payment systems 100, a plurality of computers and/or components, such as a plurality of consumer or user mobile devices 104 and a plurality of issuer FIs 114, may be included.

The QR code payment system 100 also includes a merchant system platform 116 that may include various computer systems and/or components. In some embodiments, the merchant system platform 116 includes a computer server for providing a merchant website 118, a merchant device 120 including a merchant software development kit (SDK) 122, a merchant terminal 124 (such as a point-of-sale (POS) terminal) that may include a QR code reader (not shown), and a merchant server computer 126. In some embodiments, a plurality of such merchant system platforms 116 are provided and may be connected to the wallet server 112 via a switch computer 136. In addition, each merchant component and/or computer system may also be in communication with one or more of the other merchant components and/or computers.

In some embodiments, the merchant device 120 is configured for generating a QR code 111 for use during a purchase transaction, which may be a dynamic QR code that is only valid for the current purchase transaction. In other implementations, the merchant may have a printed QR code for scanning by a consumer during a purchase transaction, or may otherwise provide a static QR code (for example, on a display screen of a feature phone). In other implementations, the merchant device 120 and/or merchant terminals 124 may be configured for reading a QR code generated by the user's mobile device 104. The user's mobile device 104 may thus be configured for communications with one or more of the merchant components 116 to initiate and complete a purchase transaction (such as a QR code push-type purchase transaction and/or a QR code pull-type purchase transaction), and may also be configured for communicating with many types of other devices, such as other user mobile devices (not shown), for example, for exchanging text and/or short messaging service (SMS) messages and the like via a mobile network operator ("MNO") system or the like (not shown in FIG. 1).

It should be understood that the consumer's mobile device 104 may be smartphone (such as an iPhone™ or an Android™ device) which typically includes components such as a microphone, speaker, touchscreen, digital camera and/or one or more sensors (i.e., a biometric sensor, such as a fingerprint scanner, not shown). In some embodiments, the mobile device 104 includes a web wallet application 106 and/or a mobile wallet application 108 which may include a software development kit (SDK) 110. In some implementations, the SDK 110 personalizes the consumer's mobile wallet, for example, to a particular issuer financial institution (FI) (such as the issuer FI 114, which issued a financial account to the user 102). Some embodiments of the consumer's mobile device 104 may also include software instructions (such as a mobile wallet application 108) configured to generate the QR code 111 for use in purchase transactions. For example, the mobile wallet application 108 may be configured for generating the QR code 111 on a display screen (not shown) of the mobile device 104 which can then be read or scanned by a camera component or a digital scanner (not shown) associated with the merchant device 120. In some embodiments, the merchant device (POS terminal or mobile device) 120 then submits or transmits the scanned data to, for example, the merchant server 126 and/or system, when then submits a transaction request to the merchant acquirer financial institution (FI) server or computer 134. The merchant acquirer FI computer 134 then forwards the transaction request to a payment network 132 for further transaction processing with relation to payment for goods and/or services.

The QR code payment system 100 shown in FIG. 1 also includes a digital enablement service (DES) computer system 130, which may include a token vault (not shown). In some implementations, the DES computer system 130 may provide a plurality of on-behalf-of (OBO) services, including digitization and tokenization services to requestors (which service replaces payment card account numbers (primary account numbers or "PANs") with tokens and places these into digital web wallet or mobile wallet environments). Such a DES computer system 130 enables connected devices to make purchases in-store, in-app and/or online (via the Internet). The DES computer system 130 is operably connected to the wallet server 112, the issuer FI computer 114, and to the payment network 132 (which may be the well-known Banknet® system operated by Mastercard International Incorporated, the assignee hereof). The payment system 132 is operably connected to the issuer FI computer 114 and to the merchant acquirer FI computer 134, which is associated with the financial institution (the merchant FI) that provides banking services to the merchant. The payment system 132 receives and routes payment transaction authorization requests that originate from the merchant server 126 and/or merchant website 118 to the correct issuer FI computer 114 (of a plurality of issuer FI computers, now shown). A practical QR code payment system 100 will also include a plurality of consumers and their associated mobile devices, as well as a plurality of merchants and their associated merchant mobile devices, POS terminals, merchant servers, and merchant acquirer FIs. As mentioned above, the DES computer system 130 provides tokenization and/or digitization services and/or token updates to the wallet server 112, may also provide identification and verification services, customer services and notifications to the issuer FI computer 114, and may also provide tokenization, transaction history and notification services to the payment network 132.

In order to conduct QR code purchase transactions with a mobile wallet application, the user or cardholder 102 must first either download a digital barcode mobile wallet application to his or her mobile device 104 from an authorized party (such as a mobile application store like the Google Play™ Store, the App Store™, and the like), or enable the wallet within the issuer mobile banking application. In order to conduct QR code purchase transactions with a web wallet, the cardholder 102 must also typically register online (e.g., from the issuer financial institution website, issuer online banking website, or wallet service provider website). For example, during registration the cardholder 102 may be required to provide consumer registration information such as the cardholder's name, billing address, and the like. If a mobile wallet application is to be enabled, the cardholder may also be requested or prompted to provide a mobile/wallet PIN (personal identification number), or to set Device Level Authentication (DLA) or provide biometrics data (e.g. fingerprint data) for wallet login and/or for the purpose of making a QR code payment. The cardholder 102 may also be prompted to add a payment method, such as a credit card account or debit card account, and an activation code sent to the cardholder for entry later when requested t in order to activate the wallet or add a payment method.

Referring again to FIG. 1, in some embodiments the QR code payment system 100 also includes a switch computer component 136 (which may be the Masterpass™ switch computer) that is operably connected to the merchant server 126 and to the wallet server 112. Such a switch computer component 136 may pass data between the merchant and the wallet server 112, and provide tools for use by registered financial institutions (such as banks) to build digital wallets that can be utilized by their customers (that can be used for cardless, in-app and/or mobile/web browser checkout). The switch computer component 132 may be owned and/or operated, for example, by a payment processing entity such as Mastercard International Incorporated. The switch computer component 136 also works together with the DES system computer 130 to allow for secure checkout for purchase transactions across multiple platforms, such as over the Internet (web interface), via an Android™ app and/or via an iOS™ app, on any type of mobile devices, including smartphones, digital wearable devices, and/or the like. In some embodiments, an external Payment Services Provider (PSP) computer (not shown) may be used for conducting online transactions.

Figure 2:
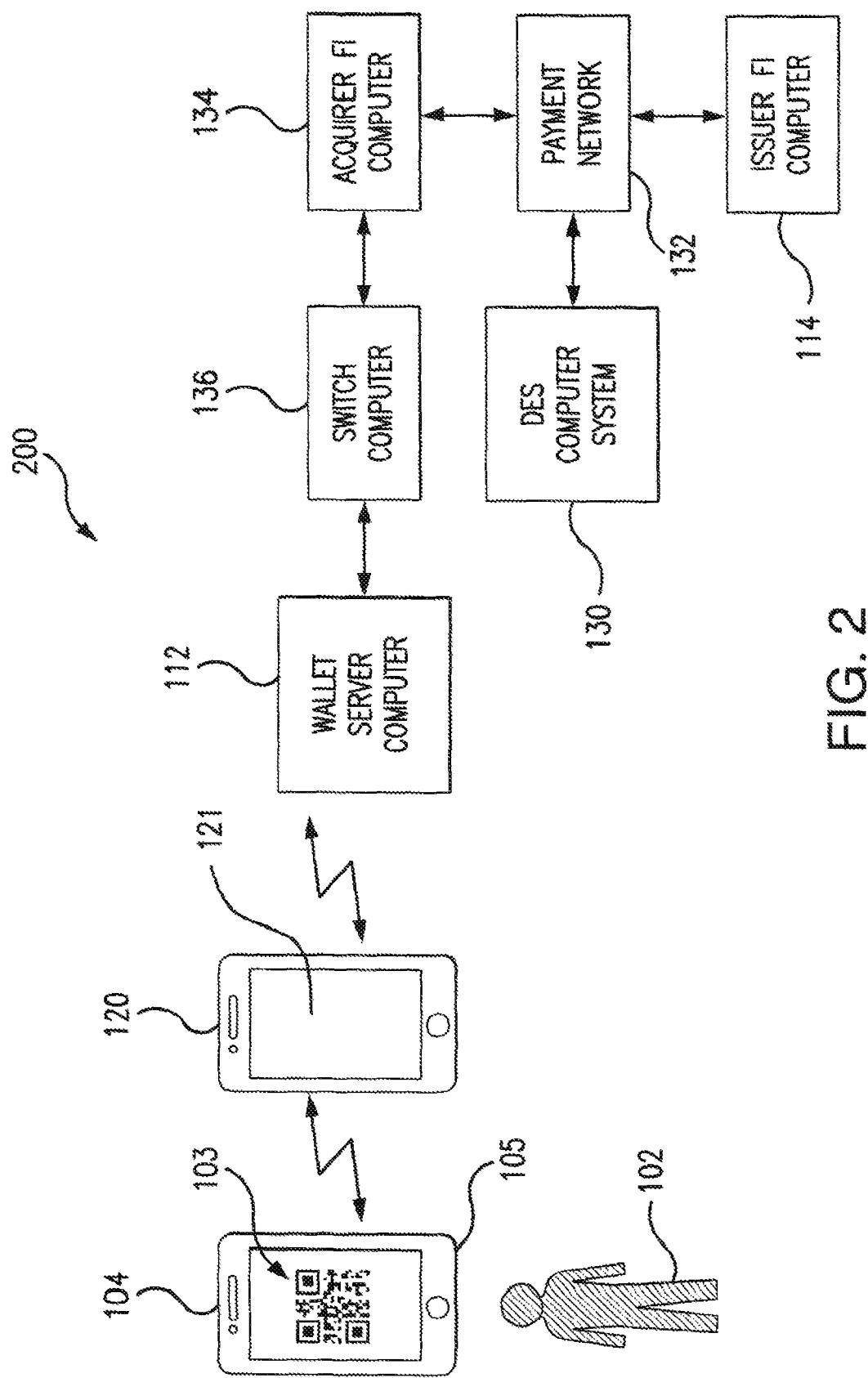
FIG. 2 is a block diagram of a QR code transaction and purchase authorization system to illustrate transaction processing in accordance with some embodiments of the disclosure.

FIG. 2 is a block diagram of a QR code transaction and purchase authorization system 200 to illustrate transaction processing in accordance with some embodiments. In some implementations, the user 102 uses his or her mobile device 104 to select a payment card account from a digital wallet, and chooses to pay by QR code. Next, the mobile wallet application generates a QR code 103 which appears on the display screen 105 and is then scanned by a camera component or scanner (not shown) of a merchant device 120. In some implementations, the user may be prompted to confirm and/or consent to payment, and also may be prompted to provide authentication data via a consumer verification method ("CVM," such as providing a mobile personal identification number (PIN), bank login, device level authentication (DLA) data or biometric data) for a "Card Present" transaction. When the consumer confirms that he or she wishes to provide payment for the transaction (and provides CVM data in some cases), tokenized smart card data may be generated by the consumer's mobile wallet application. In some embodiments, Mobile Device (MD) and User Mobile Device (UMD) cryptograms are generated by the mobile wallet application in accordance with Mastercard™ Cloud Based Payments (MCBP) specifications 1.0/2.0. Next, purchase transaction authorization occurs by using "business as usual" (BAU) transaction processing of data utilizing the switch computer 136, acquirer FI computer 134, payment network 132, the DES computer system 130, and the issuer FI computer 114. In such BAU processing, the issuer FI computer 114 receives the necessary data from payment network 132 to make a purchase transaction authorization decision either authorizing or denying a particular purchase transaction (which may be based on the transaction data and the current status of the user's payment card account, for example).

Referring again to FIG. 2, for a digital secure remote payment (DSRP) transaction, the user 102 utilizes a mobile wallet application or a web wallet application to generate the QR code 103 on display screen 105, or the merchant utilizes a merchant device 120 to generate a QR code (not shown) which then appears on the display screen 121. Thus, either the merchant scans the consumer generated barcode or QR code 103 with the merchant device 120, or the consumer uses his or her mobile device 104 and mobile payment application to scan the merchant generated QR code (not shown) appearing on the display screen 12. Next, in some implementations the user receives a notification to complete the transaction and is prompted to enter a CVM (i.e., a mobile PIN, biometric data, and the like) to verify the purchase transaction. A Digital Secure Remote Payment (DSRP) device token is then generated by the mobile payment application, if supported by the device, or a DSRP cloud token is retrieved from the wallet server 112. Next, purchase transaction authorization occurs by using "business as usual" (BAU) processing of data utilizing the switch computer 136, acquirer FI computer 134, payment network 132, the DES computer system 130, and the issuer FI computer 114 transaction flow.

One or more of the QR code purchase transaction methods described above may not be permitted in some countries due to bank requirements, regulatory requirements, or both, for example. Thus, the disclosed methods and systems allow entities, such as issuer financial institutions (FIs), with a way to launch a QR code purchase transaction product in any marketplace without having to worry about and/or plan for specific country or jurisdiction regulations governing how QR code purchase transactions must be processed, and without the need to plan for how originating institutions (OIs) and/or receiving institutions (RIs) are configured with regard to processing QR code transactions. Specifically, the disclosed systems and methods are advantageously push-type process and pull-type process agnostic, which means that any specific purchase transaction method which is deemed unacceptable can be translated to an acceptable form of purchase transaction (if required). A specific type of purchase transaction process (for example, a QR code push-type payment transaction) may be unacceptable according to certain criteria or rules of one or more entities involved in the purchase transaction, and/or according to rules and/or regulations of the jurisdiction or country wherein the purchase transaction is taking place. Systems and methods disclosed herein rectify such situations by translating or by transforming the "unacceptable" purchase transaction method into an acceptable form of purchase transaction, and advantageously process the transaction so that it satisfies market and/or regulatory requirements. In addition, issuer FIs, acquirer FIs and/or merchants further benefit from the disclosed systems and methods as they need not create new infrastructure to handle any particular type of QR code purchase transaction.

Figure 3:
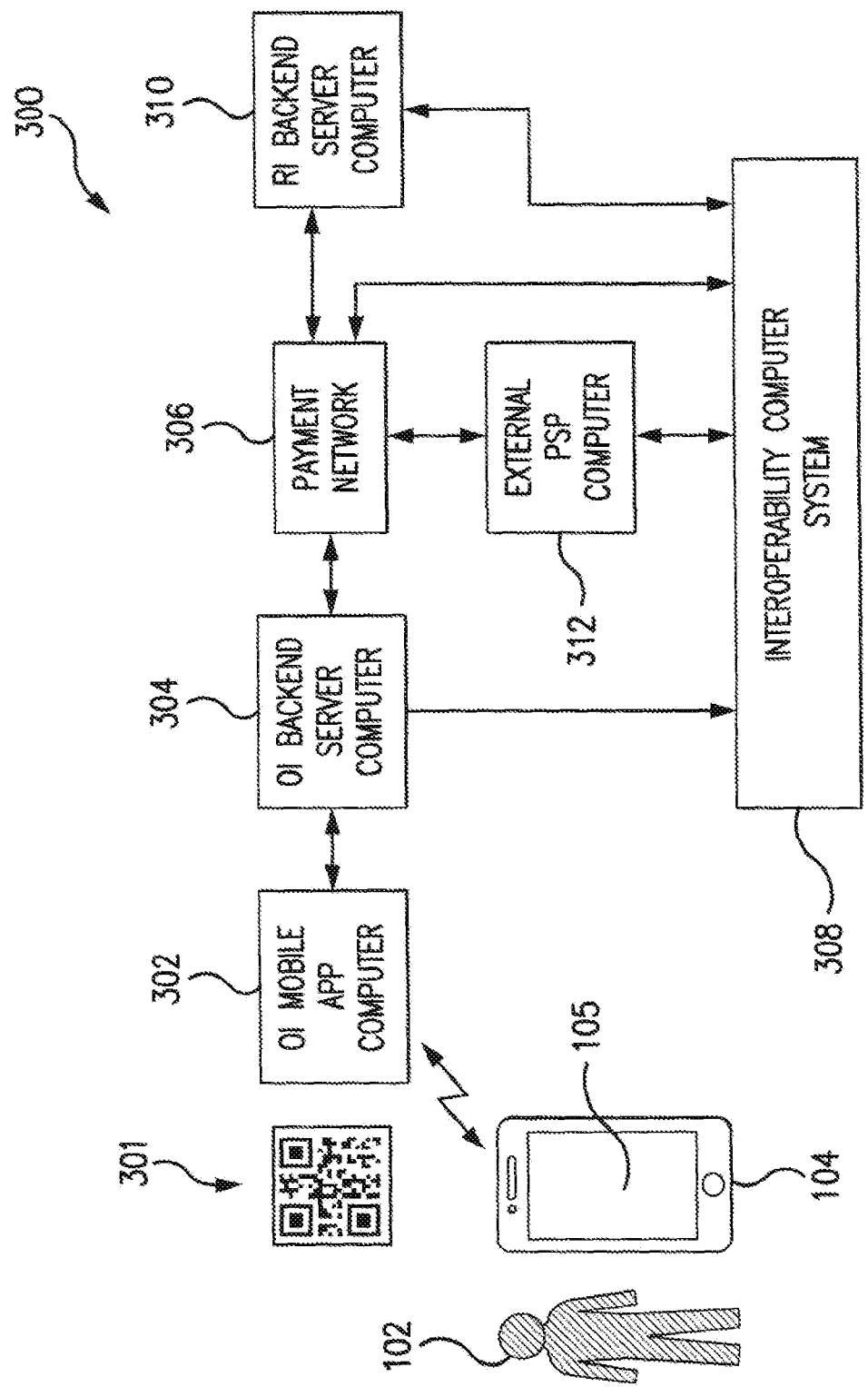
FIG. 3 is a block diagram of an embodiment of a QR code system for providing QR code purchase transaction solutions that satisfy market and/or regulatory requirements in accordance with some embodiments of the disclosure.

FIG. 3 is a block diagram of an embodiment of a QR code system 300 for providing QR code purchase transaction solutions that satisfy market and/or regulatory requirements. Specifically, the QR code system 300 can support both QR code push-type purchase transactions and QR code pull-type purchase transactions in accordance with various requirements and/or criteria.

In a first example, a consumer 102 utilizes his or her smartphone 104 to scan a merchant QR code 301 (alternately, if the consumer's mobile device is a feature phone then the consumer enters a QR alias code) and then transmits the QR code data to an originating institution (OI) mobile application computer 302. Next, the OI backend server computer 304 receives and validates the QR code and transmits a request to the OI mobile application computer 302 to forward to the user's smartphone 104 for an amount of the purchase transaction. The consumer enters the amount on the smartphone 104 by using a touch screen 105 and sends it to the OI mobile application computer 302 which forwards it to the OI backend server computer 304.

In the case where the consumer's digital wallet is owned by the OI (i.e., the OI is the issuer financial institution (FI) of the consumer's payment card account), then the OI backend server computer 304 transmits the data to the interoperability computer system 308 (which may include, for example, a digital enablement services (DES) computer) to enable either a push-type transaction or a pull-type transaction, which depends upon what the OI supports. For example, if the OI can support a push-type transaction and the market requirements for the transaction are met, then the OI deducts the transaction amount form the consumer's payment account and transmits the transaction data to the interoperability computer system 308 which then orchestrates payment based on merchant capability (for example, via the payment network 306 and RI backend server computer 310). Thus, if the merchant is capable of receiving payment via a push-type transaction, then the interoperability computer system 308 just processes the transaction in that manner. However, if the merchant is not capable of receiving payment via a push-type transaction, then the interoperability computer system 308 operates as a go between system to process the payment transaction as a pull-type transaction (so that funds are pulled from the consumer's payment account and transferred to the merchant's financial account). For example, the interoperability computer system 308 can utilize an escrow account (not shown) to temporarily store the funds which were deducted from the consumer's financial account in the push-type transaction, and then structure a pull-type transaction to transmit the funds to a financial account of the merchant (via the RI backend server computer 310).

In another example, when the consumer's wallet is owned by a third party (such as Google™ or the Samsung™ or the like) then the OI mobile backend computer 304 transmits transaction data (the QR code data) to the interoperability computer system 308 which performs a lookup function in a local repository (for example, a local database which is not shown in FIG. 3) to evaluate the transaction parameters. For example, the transaction parameters may include, but are not limited to, the identity of the Issuer FI, what the existing Merchant support is for a push-type transaction, local market requirements, and the like. In some embodiments, based on the evaluation of the transaction parameters the interoperability computer system 308 determines whether to process the purchase transaction as a push-type transaction or as a pull-type transaction. For example, if push-type transactions are supported, then the interoperability computer system 308 obtains funds from cardholder's payment account and then pushes it to the merchant's financial account. But if push-type transactions are not supported, then the interoperability computer system 308 passes the transaction data to the merchant acquirer or functions on-behalf-of (OBO) the merchant to initiate a pull-type purchase transaction to transfer the funds from the consumer's payment account to the merchant's financial account. In this case, in order to process a pull-type transaction the interoperability computer system 308 passes the payment credentials to the acquirer FI or merchant processor which was designated or captured at the time of enrollment.

Referring again to FIG. 3, if the interoperability computer system 308 determines that the RI routing configuration requires pull-type purchase transactions, then the interoperability computer system 308 transmits the purchase transaction request to the external payment service provider computer 312. The external payment service provider 312 then generates and forwards the necessary purchase transaction information to the payment network 306 for further pull-type purchase transaction processing. In particular, the payment network 306 transmits a pull-type purchase transaction request to the issuer FI (here the OI backend server computer 304) to pull funds from the cardholder's or consumer's payment card account for delivery to the receiving institution (RI), represented in FIG. 3 by the RI backend server computer 310.

Figure 4:
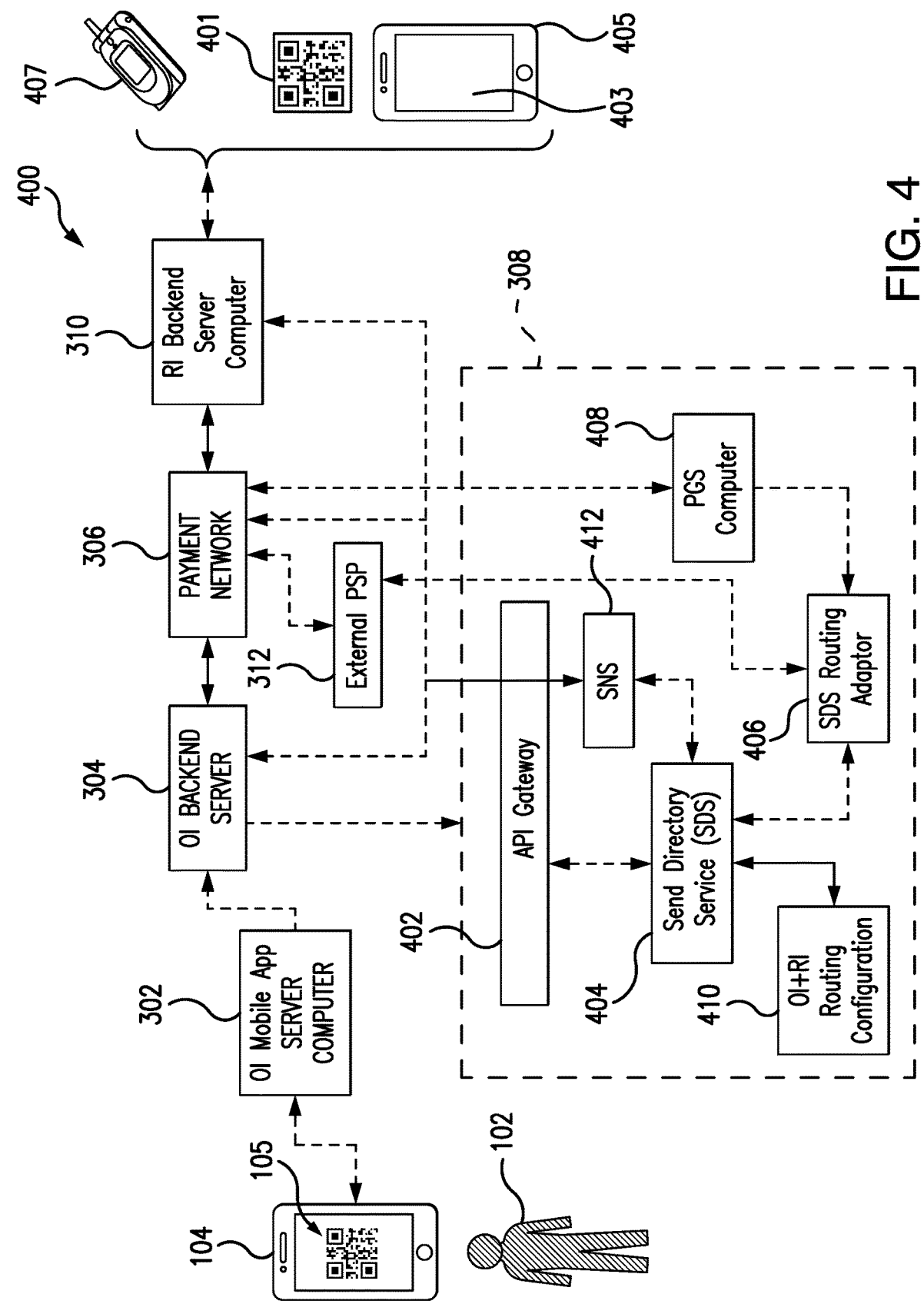
FIG. 4 is a block diagram of a QR code system for providing QR code purchase transaction solutions which satisfy market and/or regulatory requirements in accordance with some embodiments of the disclosure.

FIG. 4 is a block diagram of a QR code system 400 for providing QR code purchase transaction solutions that satisfy market and/or regulatory requirements in accordance with some embodiments. The QR code system 400 can support both QR code push-type purchase transactions and QR code pull-type purchase transactions in accordance with various requirements and/or criteria.

In an example, a consumer 102 utilizes his or her smartphone 104 to scan a merchant QR code 401, which may be printed on a piece of paper, sticker or the like, and which may be located in the merchant's retail store. In another implementation, the consumer 102 may utilize the smartphone 104 to scan a dynamic QR code (not shown) appearing on a display screen 403 of a merchant's smartphone 405 (and which has been generated by the merchant's smartphone). In yet another implementation, the merchant may use a feature phone 407 which may display a QR alias code that the consumer can manually enter into a mobile application running on his or her smartphone 104. The smartphone 104 then transmits the QR code data to an originating institution (OI) mobile application computer 302.

In some implementations, the OI mobile application computer 302 validates the QR code and transmits a request to the user's smartphone 104 for an amount of the purchase transaction. The consumer 102 enters an amount of money for the purchase transaction (for example, by using a touch screen 105) which is then transmitted to the OI mobile application computer 302 (hosted, for example, by the issuer bank). The OI mobile application computer 302 forwards the information to an OI backend server computer 304, which then generates a push-type payment request (to transfer funds from the consumer's payment card account to the merchant's payment account) and transmits the push-type payment request to the payment network 306 and to an application programming interface (API) gateway computer 402 of an interoperability computer system 308. The API gateway computer 402 routes the payment request to a send directory service (SDS) computer 404, which functions to validate the OI payment request by transmitting a validation request message via a SDS routing adapter 406 to a payment gateway service (PGS) computer 408 (which may be the MPGS operated by Mastercard International Incorporated) and to the external PSP computer 312. The external PSP computer 312 then validates the merchant enrollment parameter, identifies the merchant configuration, and then submits the purchase transaction directly (or through a relationship acquirer FI) to the payment network 306 (for example, the Banknet™ network operated by Mastercard International Incorporated). The payment network 306 then validates the message and passes it to the issuer FI (shown here as the Receiving Institution (RI) backend server computer 310) for authorization approval. The response from the issuer FI (or RI backend server computer 310) is next provided back to the external PSP 312 directly or through a merchant acquirer FI based on the origination and post validation information contained in the response from the issuer FI. The external PSP 312 then transmits the validation response to the SDS routing adapter 406.

In some implementations, the wallet provider (which may be the issuer FI or a third-party entity) may invoke a payment gateway application programming interface (API) (for example, the MPQR API) for processing the QR data. For example, the wallet will invoke the MPQR API which will then facilitate the orchestration of a push or pull-type transaction by calling a targeted payment gateway API. The payment gateway API forwards a request for internal processing, which is based on merchant data, OI data and market enrollment data, to determine how to execute the purchase transaction. If a determination is made to execute the transaction as a push-type transaction, then a routing server computer makes a call to a Send Payment API or to a Merchant Transfer API to credit the funds to the merchant's financial account. However, if a determination is made to execute the transaction as a pull-type transaction, then the enrollment parameters are verified to determine if the merchant has preference to have an external payment services provider (PSP) 312 handle the transaction processing, or to have a merchant acquirer FI (for example, the RI backend server computer 310) handle the transaction processing. Alternatively, the merchant may prefer that transaction data routing and/or processing can be done by an on-behalf-of (OBO) Service via a payment gateway service computer 408 (such as the MasterCard payment gateway service (MPGS)). The external PSP 312 or the gateway service computer 408 then executes the transaction as pull-type transaction based on the existing transaction processing capabilities (for example, by submitting the transaction data to a payment network 306 (such as the "Banknet" system) which then routes the purchase transaction data to an issuer FI (not shown) for approval. The issuer FI's decision concerning whether or not to authorize the purchase transaction (an approval or a denial) is then routed back to the external PSP computer 312, or to the payment gateway service computer 408, by the payment network 306. The external PSP computer 312 or the payment gateway service computer 408 then sends the result (transaction approved or denied) received from the issuer FI to the SDS routing adapter 406 on an open session. The SDS routing adapter 406 then processes the transaction to determine the next steps. For example, if the purchase transaction was approved by the Issuer FI, then in some implementations a notification to that effect may be transmitted to the consumer mobile device 104 via the wallet provider and may also be transmitted to the merchant's smartphone 405, for example. If the transaction was declined, then an appropriate error message may be passed back to the wallet provider for transmitting a declined notification to the consumer and to the merchant.

Referring again to FIG. 4, in some implementations after an OI payment request is validated the SDS computer 404 determines both an originating institution (OI) routing configuration and a receiving institution (RI) routing configuration by performing a look-up operation in the OI and RI routing configuration database 410. Thus, the OI and RI routing configuration database 410 contains qualifications criteria concerning what type(s) of purchase transaction processing is/are supported by the OI and by the RI. Thus, if the OI is configured for push-type purchase transactions in the jurisdiction where the purchase transaction is occurring, then the PGS computer 408 (which may be the Mastercard payment gateway service or MPGS) transmits instructions to the payment network 306 to transmit funds from the OI backend server computer 304 to the RI backend server computer 310. The Payment network 306 then processes the transaction in accordance with the usual purchase transaction processing, wherein the RI backend server computer 310 (associated with the issuer FI) determines if the purchase transaction should be authorized or declined, and sends the appropriate message to the OI backend server 304 (associated with the merchant).

In another example, if the purchase transaction originates from a country supporting push-type payments from an OI-based wallet, and if both the merchant and the OI are capable of supporting push-type payments, then OI will deduct the funds from the consumer's account and pass the payment credentials to a send platform. The send platform then generates a message to credit the funds to the merchant's account. In this case, the response received by acquirer FI upon credit of funds is then passed by send platform back to OI (the institution which originated the transaction).

However, if the criteria found in the OI and RI routing configuration database 410 indicates that the OI is not configured for a push-type QR code payment, or country or jurisdiction rules and/or regulations do not permit push-type QR code payments, then the SDS computer 404 initiates a transaction routing request via the SDS routing adapter 406 to the gateway service computer 408 and to the external PSP 312 to submit the QR code transaction as a pull-type purchase transaction to the payment network 306. In such a case, the payment network 306 then completes a pull-type purchase transaction with a configured acquirer identifier ("Acq ID") of the merchant for use in the purchase transaction with the Issuer FI. The payment network 306 next transmits a notification message to the gateway service computer 408 and/or to the external PSP computer 312, and at least one of the gateway service computer 408 and the external PSP computer 312 provides the SDS routing adapter 406 with a transaction status message. In some implementations, the SDS computer 404 transmits update messages and/or sends notification messages to the originating institution (OI) and/or to the receiving institution (RI) via a send notification service (SNS) computer 412.

Referring again to FIG. 4, when the SDS computer 404 performs a lookup for both the OI routing configuration and for the RI Routing configuration in the OI and RI routing configuration database 406, in some situations it may be found that the receiving institution (RI) is configured for a pull-type QR code transaction. When this occurs, then the purchase transaction may be invoked to the configured external PSP computer 312 via the SDS routing adapter 406 to handle further processing. In some implementations, the external PSP computer 312 will handle the QR code purchase transaction by instructing the payment network 306 to handle it as a pull-type purchase transaction, and may also provide a notification of the final result of the issuer FI's purchase transaction decision (authorize or decline) to the consumer's mobile device 104 and/or to the merchant. Accordingly, if the OI initiates a push-type payment transaction because the OI can support it, but it is determined that the RI is not capable of supporting the push-type payment transaction, then the interoperability computer system 308 will initiate a pull-type transaction via the external PSP computer 312, which stands-in on-behalf-of (OBO) the issuer FI because the issuer FI has already debited the consumer's payment account for the amount of the purchase transaction. In some implementations, funds equal to the purchase transaction amount are held in a temporary escrow account (not shown), or by a temporary escrow amount service which may be managed by the interoperability computer system 308 OBO the issuer FI.

Figure 5:
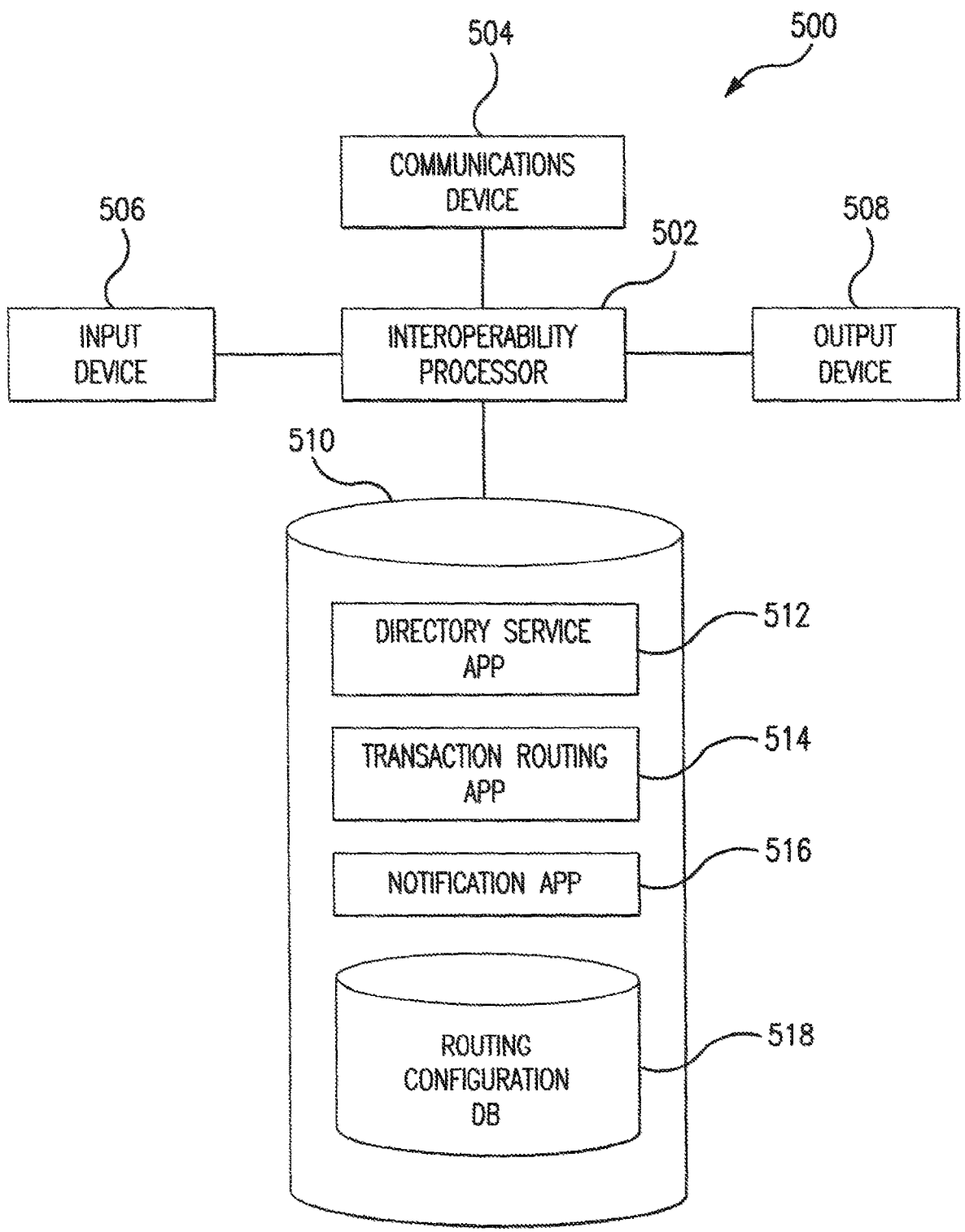
FIG. 5 is a block diagram of an embodiment of an interoperability computer which may be used in accordance with aspects of the disclosure.

FIG. 5 is a block diagram of an embodiment of an interoperability server computer 500 which may be used in accordance with aspects of the disclosure. The interoperability server computer 500 may include standard components and/or custom-designed components and/or proprietary components in terms of its hardware and/or its architecture, and may be controlled by software to cause it to function as described herein. For example, the interoperability server computer 500 may include server computer hardware.

Referring to FIG. 5, the interoperability server computer 500 may include an interoperability processor 502 operatively coupled to a communication device 504, an input device 506, an output device 508, and a storage device 510. The interoperability processor 502 may be constituted by one or more processors (one or more of which may be custom designed), and operates to execute processor-executable steps, contained in program instructions described below, so as to control the interoperability server computer 500 to provide desired functionality.

Communication device 504 may be used to facilitate communication with, for example, other devices (such as computers operated by an external payment services provider, acquirer FIs and/or issuer FIs, one or more consumer mobile devices, and/or one or more computers operated by a payment network, as shown in FIGS. 3 and 4). For example, communication device 504 may comprise numerous communication ports (not separately shown), to allow the interoperability server computer 500 to communicate simultaneously with a number of other computers and other devices, including communications as required to simultaneously handle numerous QR code purchase transaction requests. Thus, the communication device 504 may be configured for wireless communications and/or wired communications via various different types of networks, such as the Internet.

Input device 506 may comprise one or more of any type of peripheral device typically used to input data into a computer. For example, the input device 506 may include a keyboard and a mouse. Output device 508 may comprise, for example, a display and/or a printer. In some embodiments, the input device 506 and the output device 508 comprise a touch screen.

Storage device 510 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as flash memory devices, such as solid state drives (SSDs), and the like. Any one or more of such information storage devices may be considered to be a non-transitory computer-readable storage medium or computer usable medium or memory.

Storage device 510 stores one or more computer programs for controlling the interoperability processor 502. The programs comprise program instructions (which may be referred to as computer readable program code means) that contain processor-executable process steps of the interoperability server computer 500, executed by the interoperability processor 502 to cause the interoperability server computer 500 to function as described herein.

The programs may include one or more conventional operating systems (not shown) that control the interoperability processor 502 to manage and coordinate activities and sharing of resources in the interoperability server computer 500, and to serve as a host for application programs that run on the interoperability server computer 500.

For example, the storage device 510 may store a directory service application 512 that controls the interoperability processor 502 to enable the interoperability server computer 500 to, for example, validate a purchase transaction request from an originating institution (OI) and perform a lookup of routing configurations based on the information received with the purchase transaction request. In addition, the storage device 510 may store a transaction routing application 514 and a notification application 516, which enable the interoperability server computer 500 to route a QR code push-type or pull-type transaction to a payment network or a payment services provider and then provide purchase transaction updates and/or notifications, respectively, to an OI and/or to a receiving institution (RI) as appropriate, in accordance with processes described herein.

The storage device 510 may also store, and interoperability server computer 500 may also execute, other instructions, applications and/or programs, which are not shown. For example, such programs may include a confirmation message reporting application, which transmits confirmation messages to merchant devices. Other programs can also include, e.g., one or more data communication programs, database management programs, device drivers, etc.

The storage device 510 may also store one or more routing configuration databases 518 required for operation of the interoperability server computer 500. Such databases may include, for example, routing information and/or regulatory requirements for both OIs and RIs that can be involved in one or more purchase transactions, and the like.

Figure 6:
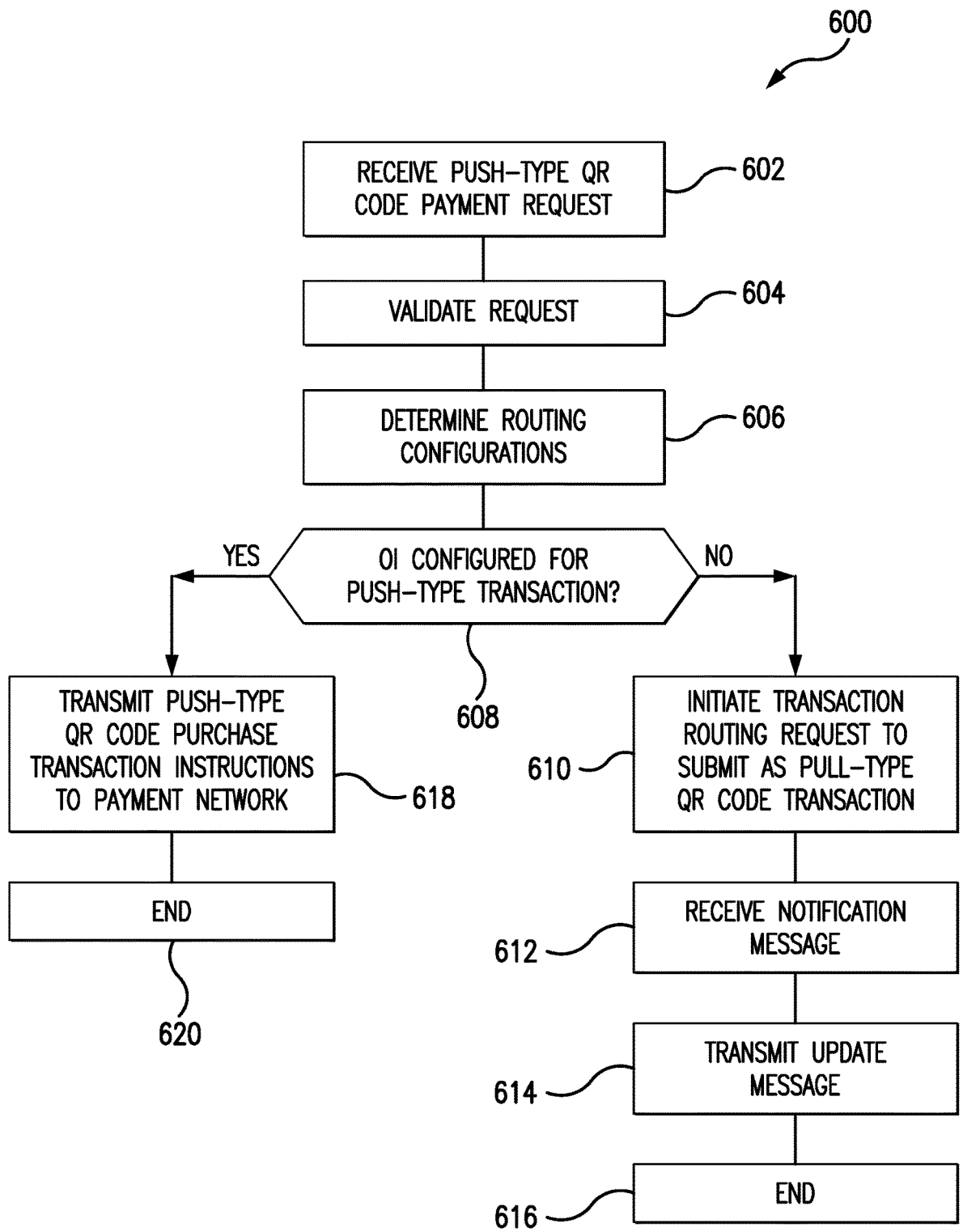
FIG. 6 is a flowchart of a QR code payment process according to some embodiments of the disclosure.

FIG. 6 is a flowchart illustrating a QR code purchase transaction process 600 for satisfying market and/or regulatory requirements according to some embodiments. In an implementation, an interoperability computer system receives 602 a push-type QR code payment request from an originating institution (OI) computer, validates 604 the QR code push-type payment request, and then determines 606 routing configurations for both the originating institution (OI) and the receiving institution (RI). In some implementations, the interoperability computer system determines the local regulations governing QR code purchase transactions. Next, the interoperability computer system determines 608 that the OI is not configured for push-type purchase transactions (and/or that the RI is not configured for push-type purchase transactions, or that local regulations do not permit push-type purchase transactions) and then generates 610 a pull-type purchase transaction request. Next, the interoperability computer system transmits 612 the pull-type purchase transaction request to an issuer financial institution (FI) via a payment network for purchase transaction processing.

In some embodiments, the interoperability computer system receives 612 a notification message concerning the issuer F's decision (to authorize or to decline the purchase transaction), transmits 614 an update message to a consumer device and/or to a merchant device, and the process ends 616. Thus, in some embodiments from a perspective of a user, the interoperability computer system automatically satisfies market and/or regulatory requirements while processing the QR code purchase transaction.

Referring again to FIG. 6, after step 606, if the interoperability computer system determines 608 that the originating institution is configured for push-type purchase transactions, then it transmits 618 the push-type purchase transaction request to a payment network for forwarding to an issuer FI for purchase transaction processing. In some implementations, in the case of a push-type purchase transaction, the interoperability computer system also transmits a status message to the receiving institution (RI) once it has received the funds and has transmitted a request for transaction processing to the originating institution OI. The process then ends 620. Thus, As used herein and in the appended claims, the term "computer" should be understood to encompass a single computer or two or more computers in communication with each other. In addition, as used herein and in the appended claims, a "server" includes a computer device or system that responds to numerous requests for service from other devices.

Also, as used herein and in the appended claims, the term "processor" should be understood to encompass a single processor or two or more processors in communication with each other. In addition, as used herein and in the appended claims, the term "memory" should be understood to encompass a single memory or storage device or two or more memories or storage devices.

The flow charts and descriptions thereof herein should not be understood to prescribe a fixed order of performing the method steps described therein. Rather the method steps may be performed in any order that is practicable, including simultaneous performance of steps, and/or in an order that omits one or more steps.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A quick response (QR) code purchase transaction process which supports both QR code push-type and QR code pull-type purchase transactions comprising:
    receiving, by an interoperability computer system from an originating institution backend server computer, a push-type quick response (QR) code payment request for a purchase transaction between a consumer and a merchant, the push-type QR code payment request including a purchase transaction amount;
    validating, by the interoperability computer system, the push-type QR code payment request;
    obtaining, by the interoperability computer system from a search of a routing configuration database, regulations of the jurisdiction wherein the purchase transaction is taking place which govern QR code purchase transactions and at least one of a routing configuration for an originating institution (OI) and a routing configuration for a receiving institution (RI);

determining, by the interoperability computer system, that one of the routing configuration of the (OI) or the routing configuration of the RI requires pull-type purchase transactions or that local regulations do not permit push-type transactions;

utilizing, by the interoperability computer system, a temporary escrow account to store funds in the purchase transaction amount;

generating, by the interoperability computer system based on the determination, a pull-type QR code purchase transaction request to transmit the funds in the temporary escrow account to a financial account of the merchant; and transmitting, by the interoperability computer system to a payment network via an external payment services computer, the pull-type QR code purchase transaction request to forward to an issuer financial institution (FI) for further purchase transaction processing.

2. The method of claim 1, further comprising:
receiving, by the interoperability computer system from the payment network, a purchase transaction response message generated by the issuer FI; and transmitting, by the interoperability computer system, the purchase transaction response message to at least one of an OI backend server computer and an RI backend server computer.

3. The method of claim 1, further comprising, subsequent to validating the QR code push-type payment request:
determining, by the interoperability computer system, that the OI and the RI are both configured for push-type purchase transactions and that local regulations allow push-type transactions;

generating, by the interoperability computer system, a push-type QR code purchase transaction request; and transmitting, by the interoperability computer system to a payment network, the push-type QR code purchase transaction request for forwarding to an issuer FI for purchase transaction processing.

4. A quick response (QR) code purchase transaction system that supports both QR code push-type purchase transactions and QR code pull-type purchase transactions comprising:
an interoperability computer system comprising at least one interoperability processor, an OI and RI routing configuration database and a storage device;

an originating institution (OI) backend server computer operably connected to the interoperability computer system;

a receiving institution (RI) backend server computer operably connected to the interoperability computer system;

an external payment service provider (PSP) computer operably connected to the interoperability computer system; and a payment network operably connected to the interoperability computer system, to the OI backend server computer, to the RI backend server computer, and to the external PSP computer;

wherein the storage device of the interoperability computer system comprises executable instructions that when executed cause the interoperability processor to:

receive a push-type quick response (QR) code payment request from the OI backend server computer for a purchase transaction between a consumer and a merchant, the push-type QR code payment request including a purchase transaction amount;

validate the push-type QR code payment request;

obtain regulations of the jurisdiction wherein the purchase transaction is taking place which govern QR code purchase transactions and at least one of a routing configuration for an originating institution (OI) and a routing configuration for a receiving institution (RI) from the OI and RI routing configuration database;

determine that one of the routing configuration of the OI or the routing configuration of the RI requires pull-type purchase transactions or that local regulations do not permit push-type transactions;

utilize a temporary escrow account to store funds in the purchase transaction amount;

generate a pull-type QR code purchase transaction request based on the determination to transmit the funds in the temporary escrow account to a financial account of the merchant; and transmit the pull-type QR code purchase transaction request to the external payment services provider to generate and transmit purchase transaction information to the payment network to forward to an issuer financial institution (FI) for further purchase transaction processing.

5. The system of claim 4, wherein the executable instructions for obtaining at least one of a routing configuration for an originating institution (OI) and a routing configuration for a receiving institution (RI) comprise instructions which cause the interoperability processor to perform a look-up function in the OI and RI routing configuration database.

6. The system of claim 4, wherein the storage device comprises further executable instructions that when executed cause the interoperability processor to:
receive a purchase transaction response message from the payment network generated by the issuer FI; and transmit the purchase transaction response message to at least one of the OI backend server computer and to the RI backend server computer.

7. The system of claim 4, further comprising executable instructions, subsequent to the instructions for validating the QR code push-type payment request, that when executed cause the interoperability processor to:
determine that the OI and the RI are both configured for push-type purchase transactions and that local regulations allow push-type transactions;

generate a push-type QR code purchase transaction request; and transmit the push-type QR code purchase transaction request to a payment network for forwarding to an issuer FI for purchase transaction processing.

8. The system of claim 4, wherein the interoperability computer system comprises an application programming interface (API) gateway operably connected to a send directory service (SDS) computer and to a send notification service (SNS) computer, an OI and RI routing configuration database operably connected to the SDS computer, an SDS routing adapter operably connected to the SDS computer, and a payment gateway service (PGS) computer operably connected to the SDS routing adapter and to the payment network.

9. An interoperability server computer that supports both QR code push-type purchase transactions and QR code pull-type purchase transactions comprising:
- an interoperability processor;
- a communication device operatively coupled to the interoperability processor;
- an input device operatively coupled to the interoperability processor;
- an output device operatively coupled to the interoperability processor; and
- a non-transitory storage device operatively coupled to the interoperability processor, wherein the non-transitory storage device comprises an OI and RI routing configuration database and executable instructions that when executed cause the interoperability processor to:
  - receive a push-type quick response (QR) code payment request from the OI backend server computer for a purchase transaction between a consumer and a merchant, the push-type QR code payment request including a purchase transaction amount;
  - validate the push-type QR code payment request;
  - obtain regulations of the jurisdiction wherein the purchase transaction is taking place which govern QR code purchase transactions and at least one of a routing configuration for an originating institution (OI) and a routing configuration for a receiving institution (RI) from the OI and RI routing configuration database;
  - determine that one of the routing configuration of the OI or the routing configuration of the RI requires pull-type purchase transactions or that local regulations do not permit push-type transactions;
  - utilize a temporary escrow account to store funds in the purchase transaction amount;
  - generate a pull-type QR code purchase transaction request based on the determination to transmit the funds in the temporary escrow account to a financial account of the merchant; and
  - transmit the pull-type QR code purchase transaction request to the external payment services provider to generate and transmit purchase transaction information to the payment network to forward to an issuer financial institution (FI) for further purchase transaction processing.

10. The apparatus of claim 9, wherein the executable instructions for obtaining at least one of a routing configuration for an originating institution (OI) and a routing configuration for a receiving institution (RI) comprise instructions which cause the interoperability processor to perform a look-up function in the OI and RI routing configuration database.

11. The apparatus of claim 9, wherein the storage device comprises further executable instructions that when executed cause the interoperability processor to:
- receive a purchase transaction response message from the payment network generated by the issuer FI; and
- transmit the purchase transaction response message to at least one of the OI backend server computer and to the RI backend server computer.

12. The apparatus of claim 9, wherein the storage device comprises further executable instructions, subsequent to the instructions for validating the QR code push-type payment request, that when executed cause the interoperability processor to:
- determine that the OI and the RI are both configured for push-type purchase transactions and that local regulations allow push-type transactions;
- generate a push-type QR code purchase transaction request; and
- transmit the push-type QR code purchase transaction request to a payment network for forwarding to an issuer FI for purchase transaction processing.

* * * * *